United States Patent [19]

Olby

[11] Patent Number: 4,486,236

[45] Date of Patent: Dec. 4, 1984

[54] CERAMIC PIGMENT

[75] Inventor: John K. Olby, Wembley, England

[73] Assignee: HMR Group Limited, Staffordshire, England

[21] Appl. No.: 585,444

[22] Filed: Mar. 2, 1984

[30] Foreign Application Priority Data

Mar. 10, 1983 [GB] United Kingdom ............. 8306575

[51] Int. Cl.$^3$ .............................................. C08K 3/22
[52] U.S. Cl. ........................................ 106/299; 106/309
[58] Field of Search .................... 106/288 B, 299, 309

[56] References Cited

U.S. PATENT DOCUMENTS

| | | | |
|---|---|---|---|
| 3,756,840 | 4/1971 | Gascon | 106/299 |
| 3,802,900 | 4/1974 | Broll et al. | 106/299 |
| 3,847,639 | 11/1974 | Broll et al. | 106/299 |
| 4,047,970 | 9/1977 | Morriss et al. | 106/299 |

*Primary Examiner*—Paul Lieberman
*Assistant Examiner*—Amelia B. Yarbrough
*Attorney, Agent, or Firm*—Watson, Cole, Grindle & Watson

[57] ABSTRACT

A grey ceramic pigment or stain which consists of zircon including, as the colorant, molybdenum sulphide or a mixture of molybdenum sulphide and molybdenum selenide.

6 Claims, No Drawings

CERAMIC PIGMENT

This invention provides a grey ceramic pigment which consists of molybdenum sulphide, or a mixed molybdenum sulphide/selenide, incorporated in zircon.

Grey pigments hitherto used in ceramic products have included:
1. Tin antimony grey, based on tin oxide and antimony trioxide. This is expensive because of its high tin content.
2. Molybdenum alumina grey, in which the molybdenum is present as an oxide. This can normally only be used as a colourant for a ceramic body as such, because it dissolves and loses colour in a glaze.
3. Mixed cobalt/nickel silicate, usually admixed with zircon. This develops a grey colour on solution in a glaze. The tone it develops varies with the glaze composition.

Molybdenum sulphide cannot be used, as such, as a colourant in a glaze because it reacts with the glaze to produce a blistered glaze surface.

The zircon grey ceramic pigment or stain according to the invention has good stability in a variety of glazes and a lower materials cost than the accepted tin antimony grey.

The stain can only be made satisfactorily from an active form of zirconia, suitable materials being hydrous zirconia or milled chemical zirconia. Silica may be used in the form of milled quartz sand or precipitated silica.

It has also been found that the molybdenum sulphide used to prepare the stain must be finely divided. This can be achieved either by forming it during the firing of the stain, or by coprecipitating it with the zirconia.

Hydrous zirconia may be obtained by reacting a solution of a zirconium salt, preferably zirconium sulphate or zirconium acetate, with an alkali, e.g. sodium hydroxide or ammonium hydroxide. The hydrous zirconia may be filtered off, washed and recovered as a damp cake. The product has a composition of approximately 50% $ZrO_2$. It is preferably not heated to dryness since this reduces its reactivity.

Hydrous zirconia may also be obtained by hydrolysis of sodium zirconate. It may conveniently be made by reacting zircon with caustic soda at 600°–700° C. and hydrolysing the product with water, when the following reactions take place:

$ZrSiO_4 + 4NaOH \rightarrow Na_2ZrO_3 + Na_2SiO_3 + 2H_2O$
$Na_2ZrO_3 + (n+1)H_2O \rightarrow ZrO_2 \cdot nH_2O + 2NaOH$.

(the sodium silicate is soluble and washes out).

Stains of maximum intensity may be prepared by generating the molybdenum sulphide, $MoS_2$, during the firing of the stain. This may be achieved by any of the following reactions:

$MoS_3 \rightarrow MoS_2 + S$ $MoO_3 + 2S + 3C \rightarrow MoS_2 + 3CO$ $MoO_3 + 2(NH_4)_2SO_4 + 9C \rightarrow MoS_2 + 9CO + 4NH_3 + 2H_2O$ $MoS_3$ may be prepared as follows:

$MoO_3 + 4Na_2S + 3H_2O \rightarrow Na_2MoS_4 + 6NaOH$ $Na_2MoS_4 + H_2SO_4 \rightarrow MoS_3 + Na_2SO_4 + H_2S$.

The stain may thus be produced by firing a mixture of reactive zirconia, preferably hydrated, silica, components capable of generating molybdenum sulphide, $MoS_2$, under firing conditions, and a conventional mineralizer, e.g. lithium fluoride or sodium fluoride, which assists in the reaction of the zirconia and silica to form zircon.

The molybdenum sulphide may be generated by reaction of molybdenum oxide, which may be derived from a source of molybdenum oxide, such as ammonium molybdate, a source of sulphur, which may be sulphur, or ammonium sulphate and a reducing agent, e.g. carbon derived from sugar.

The tone of the stain, which is normally slightly greenish, may be altered to a more neutral colour by including, when the molybdenum sulphide is produced by reaction of molybdenum oxide, ammonium sulphate and carbon, an excess of ammonium sulphate in the stain mix. It is also possible to obtain a more nuetral tone by replacing some of the suphur in the molybdenum sulphide by selenium. This also gives some increase in stain intensity. The optimum proportion has been found to correspond to the replacement of 30% of the sulphide ion by selenide ion.

It is also possible to obtain a stain of lesser intensity by firing a milled mixture of zirconia, silica, and molybdenum sulphide/selenide together with a mineralizer.

It is believed that the colourant in the stain is $MoS_2$ (or $Mo(S,Se)_2$). In the preparation of the coprecipitated stain it has not been found possible to precipitate $MoS_2$. Instead, the higher dark brown trisulphide $MoS_3$ has been coprecipitated with the zirconia. During the firing this is believed to break down to $MoS_2$ and sulphur which presumably volatilises. Molybdenum trisulphide may conveniently be precipitated from a solution of a thiomolybdate by the addition of an acid. Coprecipitation of zirconia and molybdenum trisulphide may be achieved by mixing a solution of a zirconium salt with a solution of a thiomolybdate. To obtain complete precipitation of the molybdenum the zirconium salt should be that of a strong acid, e.g. the sulphate.

The fired stain always contains some free molybdenum sulphide or sulphide/selenide not incorporated in zircon. This must be removed or the stain will cause blistering in glaze. This may be effected by extracting the stain with nitric acid, or alternatively by refiring the stain in an open container to oxidise the free sulphide.

The invention will now be further illustrated with reference to the following Examples:

EXAMPLE 1

A mixture was made of the following components:
Milled chemical $ZrO_2$: 40 g
ground quartz sand: 20 g
LiF: 3 g
$Na_2SO_4$: 8 g
$MgSO_4 \cdot 7H_2O$: 2 g
$(NH_4)_6Mo_7O_{24}4H_2O$: 6 g
$(NH_4)_2SO_4$: 9 g Sugar: 9 g After mixing these components were damped with 10 ml water, dried and fired for 1 hr at 900° C. in a covered crucible. The whole was then refired without a lid for 1 hour at 900° C. The product was a grey glaze stable stain.

EXAMPLE 2

66 g zirconium orthosulphate were dissolved in water and added to a solution of:

3.4 g. $(NH_4)_6Mo_7O_{24} \cdot 4NH_2O$ dissolved in 9.2 ml ammonia plus 32 ml water.

The product was filtered and the residue washed and dried by suction. The resulting filter cake was mixed with:

11.4 g ground quartz sand
1.7 g LiF
4.5 g $Na_2SO_4$
1.2 g $MgSO_4 \cdot 7H_2O$
5.1 g $(nH_4)_2SO_4$ 5.1 g Sugar The mix was fired for 1 hr at 830° C. The product was wet milled and then extracted with hot dilute nitric acid to furnish a deep grey glaze stable pigment.

EXAMPLE 3

8.0 g $(NH_4)_6Mo_7O_{24} \cdot 4H_2O$
20.8 g $Na_2S \cdot 2H_2O$
and 24.0 g NaOH were dissolved in 100 ml water. The solution was mixed with 125 ml zirconium orthosulphate solution with a zirconia content of 18% by weight. The mixture was heated to boiling to render it filterable. It was then filtered and washed. The filter cake was mixed with:

16 g milled quartz sand
4.2 g NaF
2.5 g LiF
1.0 g $MgSO_4 \cdot 7H_2O$

The product was fired 1 hr at 950° C., milled, extracted with hot dilute nitric acid, washed and dried to give a grey glaze stable pigment.

EXAMPLE 4

A mixture was made of the following components:
40 g milled chemical zirconia
20 g ground quartz sand
4 g LiF
6.5 g $Na_2SO_4$
2 g $MgSO_4 \cdot 7H_2O$
6 g $(NH_4)_6Mo_7O_{24} \cdot 4H_2O$
9 g $(NH_4)_2SO_4$
1.8 g $Na_2SeO_3$
8.5 g Sugar After mixing these components were damped with 8 ml water. The product was dried and then fired for 1 hr at 950° C. in a covered crucible. The lid was removed and the whole was refired for 1 hour at 950° C. The product was milled, washed and dried to give a deep grey glaze stable pigment.

EXAMPLE 5

A weak grey stain was produced by milling zirconia, silica and molybdenum sulphide together and firing a mix of the product with added mineralizer. The quantities were as follows:

120 g zirconia
60 g silica
12 g molybdenum sulphide

These components were milled together for 15 hours. 50 g of the product were mixed with:

1.8 g NaF
1.1 g LiF and fired 1 hr at 950° C. in a closed crucible. The product was milled, extracted with nitric acid, washed, dried and tested.

EXAMPLE 6

8.0 g ammonium molybdate
100 ml zirconium acetate solution containing 22% zirconia and
12.0 g hydrazinium sulphate were mixed and made up to 300 ml with water. The liquid was then heated until all suspended matter dissolved when the liquid became nearly black. This liquor was added dropwise to a mechanically stirred solution of 40 ml 0.880 ammonia in 1000 ml of water. The resulting nearly black coprecipitate was washed, filtered and dried at 130° C. The product was milled then suspended in 35 ml of sodium silicate solution of density 1.50 made up to 200 ml with water. 50% v/v sulphuric acid was added to the suspension until it gelled. The product was washed, filtered and dried. The dried precipitate (36 g) was mixed with:

2.9 g flowers of sulphur
3.9 g sugar
0.5 g lithium fluoride and fired for ½ hour at 1050° C. in a closed crucible.

The product was milled, extracted with hot dilute nitric acid, washed and dried to give an intense grey glaze stable pigment.

I claim:

1. A grey ceramic pigment which consists of molybdenum sulphide, incorporated in zircon or a mixed molybdenum sulphide and molybdenum selenide incorporated in zircon.

2. A method of preparing a pigment as claimed in claim 1, which consists in firing a mixture of (1) reactive zirconia, (2) silica, (3) components capable of generating molybdenum sulphide, $MoS_2$, or a mixture of molybdenum sulphide and molybdenum selenide, under firing conditions and (4) a mineralizer, and removing free molybdenum sulphide and molybdenum selenide from the fired stain.

3. A method according to claim 2, wherein 30% of the sulphide ion is replaced by selenide ion.

4. A method according to claim 2, wherein the molybdenum sulphide is generated by reaction of molybdenum trioxide, a source of sulphur and a reducing agent.

5. A method according to claim 2, wherein the molybdenum sulphide is generated by breakdown of molybdenum trisulphide to the disulphide.

6. A method of preparing a pigment as claimed in claim 1, which consists in firing a milled mixture of zirconia, silica and molybdenum sulphide and molybdenum selenide together with a mineralizer and removing free molybdenum sulphide and molybdenum selenide from the fired stain.

* * * * *